United States Patent
Abou-Emara et al.

(10) Patent No.: US 7,661,006 B2
(45) Date of Patent: Feb. 9, 2010

(54) METHOD AND APPARATUS FOR SELF-HEALING SYMMETRIC MULTI-PROCESSOR SYSTEM INTERCONNECTS

(75) Inventors: Luai A. Abou-Emara, Austin, TX (US); Mark David McLaughlin, Austin, TX (US); Jorge N. Yanez, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 11/621,354

(22) Filed: Jan. 9, 2007

(65) Prior Publication Data

US 2008/0168255 A1    Jul. 10, 2008

(51) Int. Cl.
G06F 1/04 (2006.01)
G06F 9/00 (2006.01)
G06F 15/177 (2006.01)
G06F 11/07 (2006.01)

(52) U.S. Cl. .............................. 713/375; 713/1; 713/2; 713/100; 714/100; 712/1; 712/2; 712/3; 712/10; 712/11; 712/15; 712/21; 712/22; 712/33

(58) Field of Classification Search .................. 713/1, 713/2, 100; 714/100; 712/1, 2, 3, 10, 11, 712/15, 21, 22, 33
See application file for complete search history.

(56) References Cited

U.S. PATENT DOCUMENTS

| | | | |
|---|---|---|---|
| 4,306,288 A | 12/1981 | Nakamura | |
| 5,020,059 A | 5/1991 | Gorin et al. | |
| 5,359,547 A | 10/1994 | Cummins et al. | |
| 5,625,841 A | 4/1997 | Dawkins et al. | |
| 5,659,748 A | 8/1997 | Kennedy | |
| 5,761,412 A | 6/1998 | Higgins | |
| 6,058,475 A | 5/2000 | McDonald et al. | |
| 6,530,002 B1 | 3/2003 | Martin et al. | |
| 6,697,854 B1 | 2/2004 | Glassen et al. | |
| 6,865,157 B1* | 3/2005 | Scott et al. | 370/242 |
| 2008/0159321 A1* | 7/2008 | Rispoli et al. | 370/419 |
| 2009/0141621 A1* | 6/2009 | Fan et al. | 370/223 |

* cited by examiner

Primary Examiner—Thomas Lee
Assistant Examiner—James Henson
(74) Attorney, Agent, or Firm—Yee & Associates, P.C.; Matthew B. Talpis (57) ABSTRACT

A computer implemented method, apparatus, and computer program product for managing symmetric multiprocessor interconnects. The process identifies functional communication connections between each processor in a plurality of processors on a multiprocessor to form identified functional communication connections. The process maps every functional communication connection between any two processors in the plurality of processors, based on the identified functional communication connections, to form an interconnect matrix. The process creates a path map using the interconnect matrix. The path map comprises a sequence of communication connections between the plurality of processors. The process initializes the plurality of processors using the path map.

20 Claims, 5 Drawing Sheets

METHOD AND APPARATUS FOR SELF-HEALING SYMMETRIC MULTI-PROCESSOR SYSTEM INTERCONNECTS

BACKGROUND OF THE INVENTION

1. Field of the Invention

The present application relates generally to a data processing system and in particular to a method and apparatus for symmetric multiprocessors. More particularly, the present application is directed to a computer implemented method, apparatus, and computer usable program code for automatically managing symmetric multiprocessor interconnects.

2. Description of the Related Art

A processor is an independent processing unit or computational unit capable of executing threads, tasks, or other processes independently of any other processor. A processor may include a single core, as well as two or more cores located on a single die. A processor having two or more cores is referred to as a multi-core microprocessor. As used herein, a processor includes, but is not limited to, a central processing unit (CPU), graphics processor, a multi-core microprocessor, or any other known or available type of processor.

A computer system having two or more independent processors is referred to as a multiprocessor. Each processor on a multiprocessor is plugged into its own processor socket and shares the same platform interface which connects each processor to memory, input/output, and storage resources. The processors in the multiprocessor system share address bus, data bus, which is also referred to as a computer bus, and self sync buses. The processors also share storage subsystems. However, each processor has its own memory controller, level one (L1) cache, and level two (L2) cache. As used herein, a multiprocessor system is a computer system that includes all the independent processors sharing address buses, data buses, self sync buses, and/or storage subsystems.

A symmetric multiprocessor system is a multiprocessor in which two or more identical processors are connected to a single shared main memory. A symmetric multiprocessor treats all processors in a multiprocessor system identically. In contrast, an asymmetric multiprocessor assigns certain tasks only to certain processors.

In a symmetric multiprocessor, it is important that two or more processors be able to access shared memory and execute on common data sets without interfering with the other processor's performance. Therefore, all processors in a symmetric multiprocessor system should be synchronized with one another during initialization of the multiprocessor.

Synchronization is a matter of time keeping. Each processor needs to be synchronized or in sync time-wise with every other processor in order to coordinate simultaneous threads or tasks executing on the multiprocessor. In other words, all of the processors need to be set to the same time. The processors are synchronized with each other by sending a data packet to each processor. The processors are able to use this data packet to synchronize (sync) with every other processor.

Processors transmit data packets to other processors on a multiprocessor by means of an interconnect bus. The interconnect bus is a communications path between all the processors on the multiprocessor. In other words, the interconnect bus connects the independent processors together by means of links or connections between two or more processors. Each processor contains driver ports for sending data to the other processors through the interconnect bus and receiving ports for receiving data from the other processors through the interconnect bus.

Currently, each multiprocessor platform is built with a specific network of interconnects, referred to as an interconnect map. The interconnect map provides information regarding all the links and connections in the interconnect bus. This interconnect map is created by system architects and provided in the system workbooks. A system workbook is a document written for multiprocessor system developers and testers. A system workbook typically contains technical data about a processor chip, a multiprocessor system, or any other technical data regarding a computer system. The interconnect map is provided in system workbooks or simply communicated from the processor chip designers to the firmware programmers. Based on this interconnect map, firmware designers select a path map.

The path map is a predetermined communication path between the processors. In other words, the path map provides a single, one-way path for traversing each processor during initialization of the processors when a multiprocessor system is booted. The path map is used to initialize and synchronize the processors. The path map is hard coded in a multiprocessor systems firmware. The path map is generated based on the interconnect map.

However, the interconnect map is sometimes inaccurate and includes mistakes or incorrect information. In addition, an interconnect map is sometimes not available in system workbooks or from any other source. In such cases, a user can sometimes decipher or generate an interconnect map based on schematics for the multiprocessor system. However, most engineers have limited access to multiprocessor system schematics. In addition, manually deciphering an interconnect map based on schematics is a time consuming and burdensome process for a user.

Unlike the interconnect map, the path map is hard-coded in system firmware. The path map is not updated or modified after its initial creation and coding into firmware. In addition, the path map only provides a single path out of many possible paths that are actually available in the hardware. In other words, multiple routes between the processors could be available. However, a system will only use the one path provided in the path map that is hard coded in firmware. If an interconnect link in the path map fails, the system has no way of passing addresses, data, and/or sync packets between the processors. This results in the system failing beyond repair. Thus, if a system encounters a faulty interconnect during initialization or runtime, the system will shut down and be unable to recover.

SUMMARY OF THE INVENTION

The illustrative embodiments provide a computer implemented method, apparatus, and computer usable program code for managing symmetric multiprocessor interconnects. In one embodiment, a process identifies functional communication connections between each processor in a plurality of processors on a multiprocessor to form identified functional communication connections. The process maps every functional communication connection between any two processors in the plurality of processors, based on the identified functional communication connections, to form an interconnect matrix. The process creates a path map using the interconnect matrix. The path map comprises a sequence of communication connections between the plurality of processors. The process initializes the plurality of processors using the path map.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
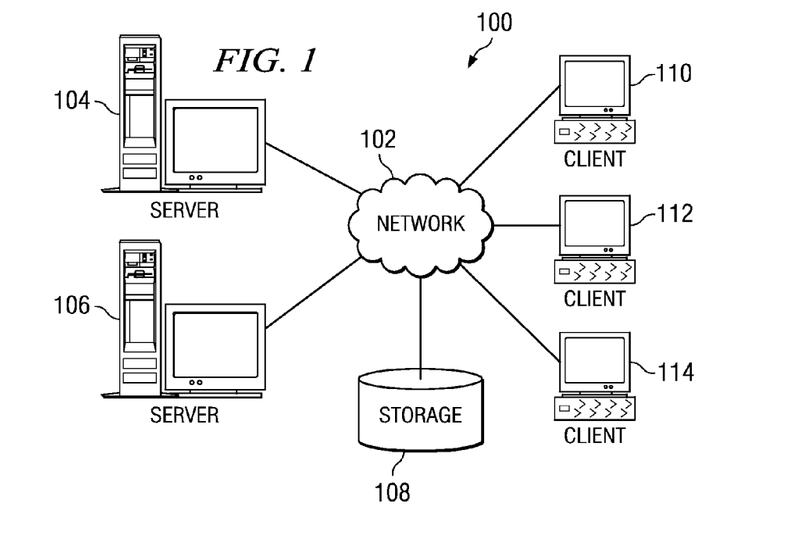
FIG. 1 is a pictorial representation of a network of data processing systems in which illustrative embodiments may be implemented.
Figure 2:
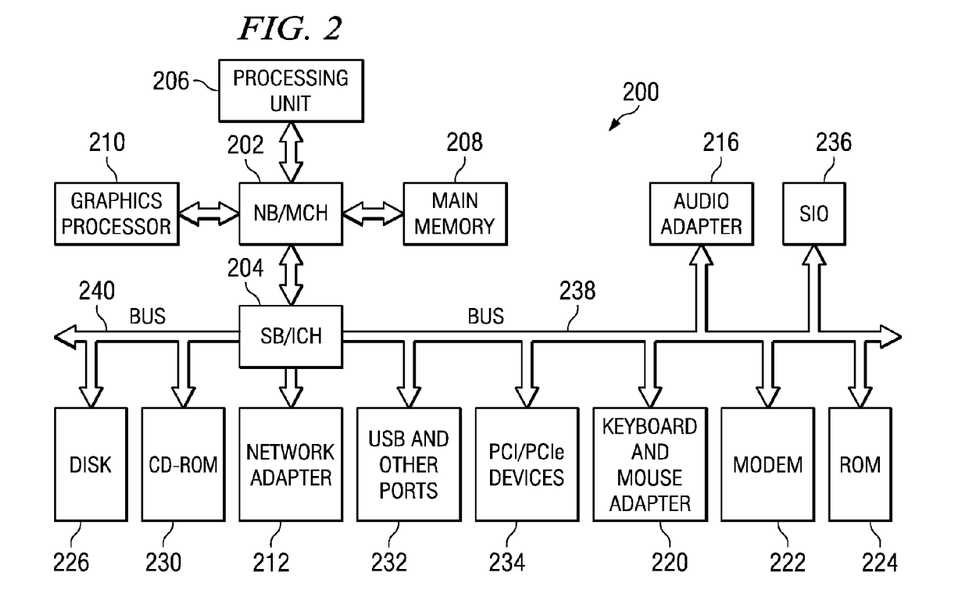
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
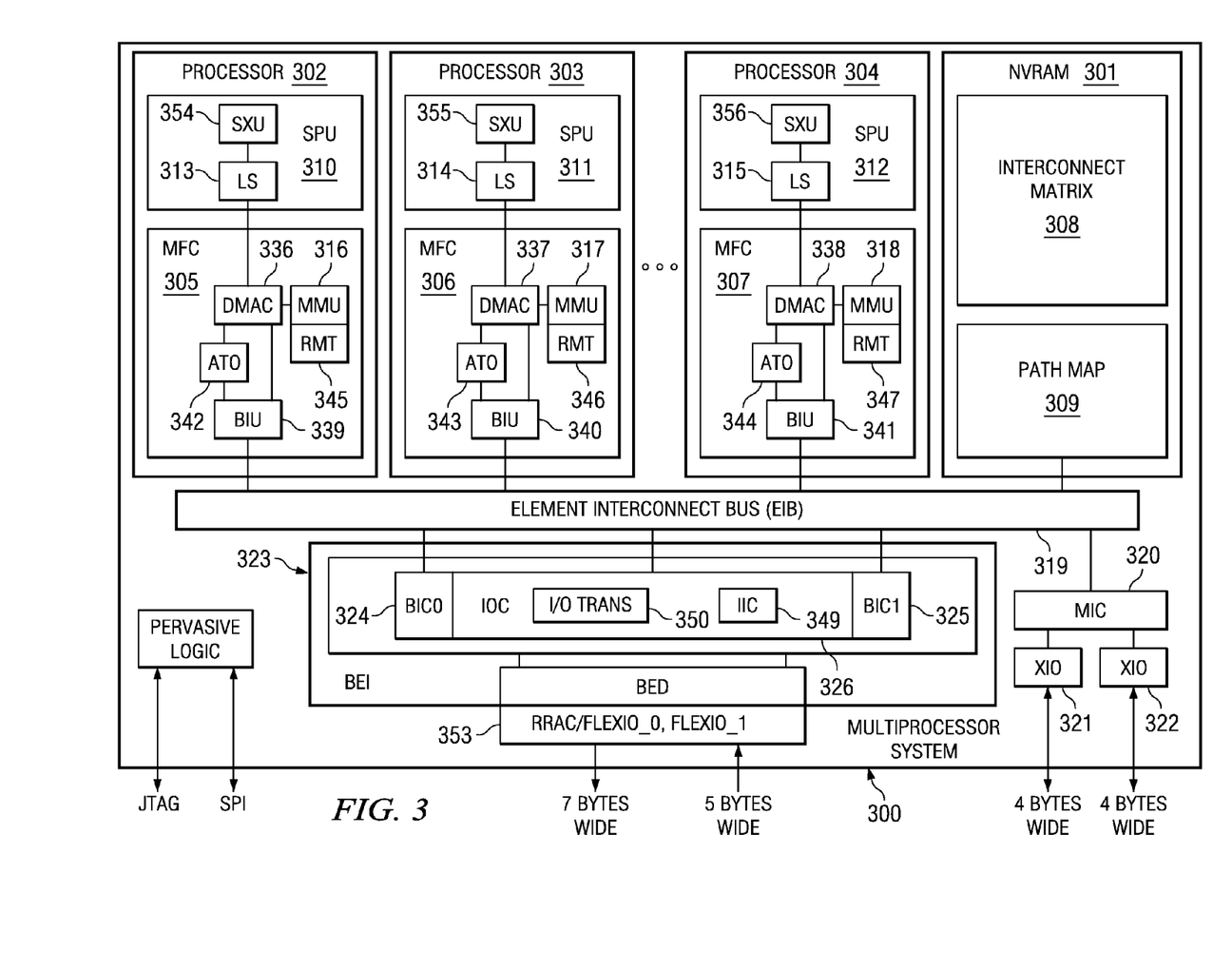
FIG. 3 depicts an exemplary diagram of a multiprocessor system in which aspects of the illustrative embodiments may be implemented in accordance with an illustrative embodiment.

Turning now to FIG. 3, an exemplary diagram of a multiprocessor system is shown in which aspects of the illustrative embodiments may be implemented in accordance with an illustrative embodiment. Multiprocessor system 300 is a single-chip, symmetric multiprocessor.

Non-volatile random access memory (NVRAM) 301 is a non-volatile memory located on multiprocessor system 300. Multiprocessor system 300 includes a plurality of processors, such as processor 302, processor 303, and processor 304. Although only three processors are illustrated, multiprocessor 300 can include any number of processors. Each of processors 302-304 is plugged into its own processor socket.

Interconnect matrix 308 is a map of every functional communication connection between any two processors in a plurality of processors. Interconnect matrix is generated during system initialization and stored in non-volatile memory, such as NVRAM 301. When a connection between two processors fails, the failed connection is logged in an error log. If the error log indicates that a connection in path map 309 is a failed connection, the interconnect matrix is updated by removing the failed connection from interconnect matrix 308.

Path map 309 is a sequence of communication connections between a plurality of processors used to transmit data between processors. Path map 309 is generated based on interconnect matrix 308. If a connection in path map 309 fails during initialization or during runtime, path map 309 can be updated based on the updated interconnect matrix. An updated path map is an alternate path map that bypasses the failed connection. When a connection between two processors fails, the failed connection is logged in an error log. If the error log indicates that a connection in path map 309 is a failed connection in path map 309, alternative path maps are provided for initializing a system when a connection in path map 309 fails.

In these examples, each processor includes one synergistic processor unit (SPU) 310, 311, or 312 with its own local store (LS) area 313, 314, or 315 and a dedicated memory flow controller (MFC) 305, 306, or 307 that has an associated memory management unit (MMU) 316, 317, or 318 to hold and process memory protection and access permission information. Once again, although synergistic processor units are shown by example, any type of processor unit in a multiprocessor may be supported.

Multiprocessor system 300 implements element interconnect bus (EIB) 319 and other I/O structures to facilitate internal and external data flow. Element interconnect bus 319 serves as the primary bus for processors 302, 303, and 304. In addition, element interconnect bus 319 interfaces to other interface controllers that are dedicated to off-chip accesses. The interface controllers include the memory interface controller (MIC) 320, which provides two extreme data rate I/O (XIO) memory channels 321 and 322, and broadband engine interface (BEI) unit 323, which provides two high-speed external I/O channels and the internal interrupt control for multiprocessor system 300. The multiprocessor interface unit 323 is implemented as bus interface controllers (BIC0 & BIC1) 324 and 325 and I/O interface controller (IOC) 326. The two high-speed external I/O channels connected to a polarity of RRAC interfaces provide the flexible input and output (FlexIO_0 & FlexIO_1) 353 for multiprocessor system 300.

Each synergistic processor unit 310, 311, or 312 has a corresponding local store area 313, 314, or 315 and synergistic execution units (SXU) 354, 355, or 356. Each individual synergistic processor unit 310, 311, or 312 can execute instructions (including data load and store operations) only from within its associated local store area 313, 314, or 315. For this reason, all required data transfers to or from storage elsewhere in a system is performed using memory flow controller direct memory access operations via synergistic processor unit's 310, 311, and 312 dedicated memory flow controllers 305, 306, and 307.

A program running on synergistic processor unit 310, 311, or 312 only references its own local store area 313, 314, or 315 using a local store address. However, each synergistic processor unit's local store area 313, 314, or 315 is also assigned a real address (RA) within the overall system's memory map. This allows privileged software to map a local store area to the effective address (EA) of a process to facilitate direct memory access transfers between the local store of one synergistic processor unit and the local store of another synergistic processor unit.

Main storage is shared by processors 302, 303, and 304, and I/O devices in a system. All information held in this level of storage is visible to all processors and devices in the system. A synergistic processor unit program accesses main storage by generating and placing a direct memory access data transfer command, with the appropriate effective address and local store address, into its memory flow controllers (MFCs) 305, 306, or 307 command queue for execution. When executed, the required data is transferred between its own local store area and main storage. The proxy command queue is typically used to store a program in local storage prior to starting the synergic processor unit. Proxy commands can also be used for context store operations.

Synergistic processor unit 310, 311, or 312 and memory flow controllers (MFCs) 305, 306, and 307 communicate with each other through unidirectional channels that have capacity. The channel interface transports messages to and from memory flow controllers 305, 306, and 307, synergistic processor units 310, 311, and 312. Bus interface units 339, 340, and 341 connect memory flow controllers 305, 306, and 307 to element interconnect bus (EIB) 319.

Memory flow controllers 305, 306, and 307 provide two main functions for synergistic processor units 310, 311, and 312. Memory flow controllers 305, 306, and 307 move data between synergistic processor unit's 310, 311, or 312 local store (LS) area 313, 314, and 315 and main storage. Additionally, memory flow controllers 305, 306, and 307 provide synchronization facilities between synergistic processor units 310, 311, and 312 and other devices in the system.

Memory flow controllers 305, 306, and 307 implementation has four functional units: direct memory access controllers (DMAC) 336, 337, and 338, memory management units (MMU) 316, 317, and 318, atomic units (ATO) 342, 343, and 344, replacement management tables (RMT) 345, 346, and 347, and bus interface units (BIU) 339, 340, and 341. Direct memory access controllers 336, 337, and 338 maintains and processes memory flow controller command queues (MFC CMDQs), which consist of a memory flow controller synergistic processor unit command queue (MFC SPUQ) and a memory flow controller proxy command queue (MFC PrxyQ).

In a virtual mode, memory management units 316, 317, and 318 provides the address translation and memory protection facilities to handle the effective address translation request from direct memory access controllers 336, 337, and 338 and send back the translated address.

Atomic units 342, 343, and 344 provide the level of data caching necessary for maintaining synchronization with other processing units in the system. Coherency with other caches in the system is maintained. Atomic direct memory access commands provide the means for the synergist processor elements to request synchronization with other units.

The main function of bus interface units 339, 340, and 341 is to provide processors 302, 303, and 304 with an interface to the element interconnect bus. Element interconnect bus 319 provides a communication path between all of the processors on multiprocessor system 300 and the external interface controllers attached to element interconnect bus 319.

Memory interface controller 320 provides an interface between element interconnect bus 319 and one or two of extreme data rate I/O cell memory channels 321 and 322. Extreme data rate (XDR™) dynamic random access memory (DRAM) is a high-speed, highly serial memory provided by Rambus. The extreme data rate dynamic random access memory is accessed using a macro provided by Rambus, referred to in this document as extreme data rate I/O cell memory channels 321 and 322.

Memory interface controller 320 is a slave on element interconnect bus 319. Memory interface controller 320 acknowledges commands in its configured address range(s), corresponding to the memory in the supported hubs.

Bus interface controllers 324 and 325 manage data transfer on and off the chip from element interconnect bus 319 to either of two external devices. I/O interface controller 326 handles commands that originate in an I/O interface device and that are destined for the coherent element interconnect bus 319. An I/O interface device may be any device that attaches to an I/O interface such as an I/O bridge chip that attaches multiple I/O devices or another multiprocessor that is accessed in a non-coherent manner. I/O interface controller 326 also intercepts access to element interconnect bus 319 that are destined to memory-mapped registers that reside in or behind an I/O bridge chip or non-coherent multiprocessor system 300, and routes them to the proper I/O interface. I/O interface controller 326 also includes internal interrupt controller (IIC) 349 and I/O address translation unit (I/O Trans) 350.

Although specific examples of how the different components may be implemented, these examples are not meant to limit the architecture in which the aspects of the illustrative embodiments may be used.

The illustrative embodiments recognize the need to automatically produce an interconnect matrix for each multiprocessor platform quickly and accurately. In addition, the illustrative embodiments recognize the need to update or modify the interconnect matrix as links or connections in an interconnect bus fail or otherwise become non-functional. Therefore, the illustrative embodiments provide a computer implemented method, apparatus, and computer program product for managing multiprocessor interconnects.

In one embodiment, a process identifies functional communication connections between each processor in a plurality of processors on a multiprocessor in an output file. A communication connection is a pathway or link on a bus between two processors. A communication connection permits one processor to send data to another processor by means of the link. A functional communication connection is a communication connection that is functioning such that a processor is able to send data to another processor by means of the communication connection. If the communication connection becomes disabled for any reason such that data can no longer be transmitted along the link, the communication connection is a non-functional or failed communication connection.

The process generates an interconnect matrix based on the output file. An interconnect matrix is a map of every functional communication connection between any two processors in a plurality of processors. The process creates a path map based on the interconnect matrix. A path map is a sequence of communication connections between a plurality of processors. The process initializes the plurality of processors in accordance with the path map. The process removes the failed connection from the interconnect matrix in response to a determination that a connection between two processors in the plurality of processors has failed to form a failed connection.

Figure 4:
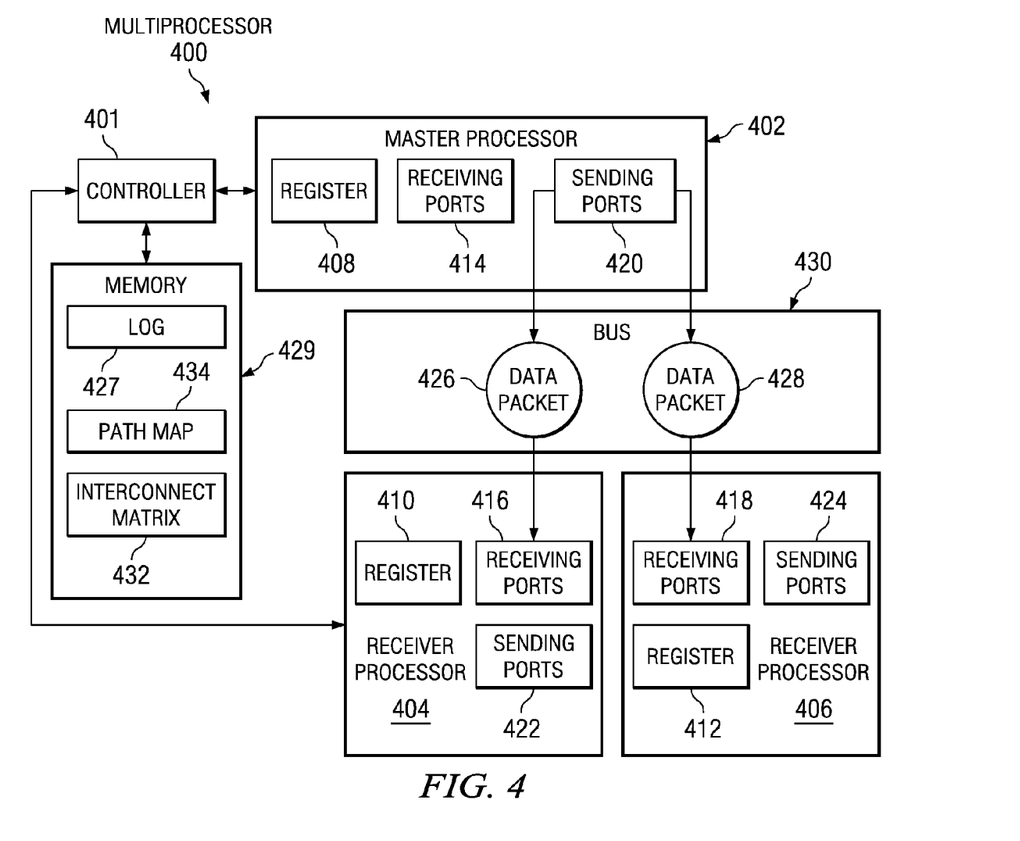
FIG. 4 is a block diagram illustrating data flow through a multiprocessor for identifying functional interconnects in accordance with an illustrative embodiment.

FIG. 4 is a block diagram illustrating data flow through a multiprocessor for identifying functional interconnects in accordance with an illustrative embodiment. Multiprocessor 400 is a device having two or more processors. The processors in multiprocessor 400 are processors that are packaged in separate integrated circuit packages. Each separate processor in multiprocessor can include a single processor core, as well as multiple processor cores in a single integrated circuit package.

Controller 401 is a software component for managing multiprocessor interconnects. Controller 401 identifies functional communication connections between each processor in a plurality of processors on a multiprocessor in an output file. Controller 401 designates a processor in the set of processors on multiprocessor 400 as master processor 402. Controller 401 makes the designation by setting a flag in a register on the processor. Each processor in the multiprocessor system is designated as a master processor in turn, until every processor has been designated a master processor for purposes of testing interconnects between the master processor and all other processors on the multiprocessor system. Controller 401 designates all other processors on multiprocessor 400 as receiver processors, such as receiving processor 404 and 406.

Controller 401 designates a processor as master processor 402 by setting a register, such as register 408. Likewise, controller 401 designates a processor as receiver processors by setting a register on the processor, such as register 410 on receiver processor 404 and register 412 on receiver processor 406.

Receiving ports 414, 416, and 418 are ports for receiving a data packet from another processor. In this illustrative example, receiving ports 414, 416, and 418 include three (3) receiving ports. Sending ports 420, 422, and 424 are driver ports for sending data packets to another processor.

Controller 401 tests the connections between each processor by designating a master processor to send a data packet to all other receiver processors. Controller 401 initiates transmission of a data packet, such as data packet 426 and 428 from sending ports 420 on master 402 to all receiver processors 404 and 406, by means of interconnect bus 430.

Interconnect bus 430 is an interconnect network for allowing processors on multiprocessor 400 to communicate with each other. Interconnect bus 430 is used by master processor 402 to transmit data packet 426 and 428 to other processors on multiprocessor 400.

Controller 401 then identifies functional connections between master processor 402 and a given receiver by opening each receiving port and determining if data packet 426 or 428 was received by the given receiver port. If the data packet was received, the connection between master processor 402 and the given receiver port is a functional connection.

Controller 401 orders receiver processor 404 to open given receiving ports 416 to determine whether the given receiver port receives data packet 426 sent by master processor 402. If controller 401 determines that the given receiving port received data packet 426, controller 401 identifies the connection between the master and the given receiving port as a functional connection in an output file, such as log 427 in memory 429. In this illustrative example, memory 429 is a non-volatile memory, such as non-volatile random access memory (NVRAM). However, memory may be any type of known or available data storage device for storing data.

If the receiving port did not receive data packet 426, the connection between master processor 402 and the given receiving port is not a functional connection. A non-functional connection may also be logged into an output file, such as log 427.

Controller 401 continues this process until every receiving port on every receiver processor has been opened to determine if each connection between master processor 402 and a given receiving port is a functional connection. Controller 401 then designates a next processor as a master processor. In this example, receiver processor 404 is designated a master and master processor 402 is designated a receiver. Processor 404 sends a data packet by means of interconnect bus 430 to all other processors to determine if a connection between receiver processor 404 and a given receiving port on each processor is a functional connection. This process is continued until every processor on multiprocessor 400 has been designated a master processor.

Thus, controller 401 iteratively designates a next processor as a master and designates all other processors as receiver processors and identifies all functional connections between the master and the receiver processors until each processor in the plurality of processors has been designated as a master. Controller 401 identifies all functional connections in an output file such as log 427.

Controller 401 generates interconnect matrix 432 based on log 427. Interconnect matrix 432 is a map of every functional communication connection between any two processors on multiprocessor 400. Controller 401 then creates path map 434 based on interconnect matrix 432. Path map 434 is a sequence of communication connections between processors. Path map 434 sets forth a path or route for sending data and synchronizing processors by means of interconnect bus 430. Path map 434 is a single path out of a set of possible paths between processors. Controller 401 initializes the processors on multiprocessor 400 in accordance with path map 434.

If a connection between two processors fails during initialization or during runtime, the failed connection is logged in an error log. Based on the error log, controller 401 removes the failed connection from interconnect matrix 432. Thus, controller 401 dynamically and automatically updates interconnect matrix 432 to reflect newly failed connections.

If the failed connection is a connection in path map 434, controller 401 generates an alternative path map based on the updated interconnect matrix. The alternative path map bypasses the failed connection. The alternative path map is saved in memory 429 as a replacement for path map 434.

If the failed connection failed during initialization of the processors, controller 401 will generate the alternative path map during initialization and continue initialization of the processor using the alternative path map. Thus, even if a connection in a path map fails during initialization, the illustrative embodiments dynamically provide an alternative path map bypassing the failed connection to enable the initialization process to continue.

In accordance with this illustrative embodiment, initialization will only be halted if controller 401 is unable to generate an alternative path map due to insufficient functional connections remaining in interconnect matrix 432. In this case, the system will shut down and be unable to be initialized until the failed connections are repaired or replaced.

If the failed connection fails during run-time, controller 401 will update interconnect matrix 432 and generate an alternative path map. However, the system will have to shut down and re-boot due to the failed connection. When the system re-initializes, the alternative path map is used to initialize the processors and bypass the failed connection. In this manner, a system is able to re-initialize even if a connection in path map fails during run-time.

Figure 5:
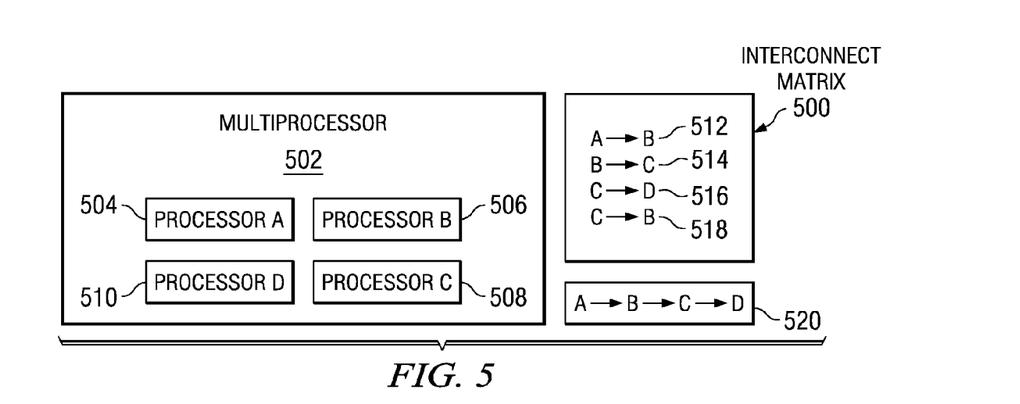
FIG. 5 is a block diagram illustrating an interconnect matrix and path map in accordance with an illustrative embodiment.

FIG. 5 is a block diagram illustrating an interconnect matrix and path map in accordance with an illustrative embodiment. Interconnect matrix 500 is an interconnect matrix for multiprocessor 502. Multiprocessor 502 is a multiprocessor, such as multiprocessor 300 in FIG. 3 and multiprocessor 400 in FIG. 4. Processor A 504, processor B 506, processor C 508, and processor D 510 are processors, such as processors 402, 404, and 406 in FIG. 4. Processors 504-510 communicate with each other by transmitting data packets from sending ports to receiving ports by means of an interconnect bus.

Interconnect matrix 500 includes all functional connections between the processors on multiprocessor 502. For example, interconnect matrix 500 includes connection 512 between processors A and B, connection 514 between processors B and C, connection 516 between processors C and D, and connection 518 between processors C and B. Connections 512-518 are one-way connections between two processors.

Path map 520 is a path map generated based on interconnect matrix 500. Path map 520 is a sequence of connections for traversing each processor in multiprocessor 502. In this example, path map 520 does not utilize every connection in interconnect matrix 500. In this example, path map utilizes connections 512-516. Thus, if connection 518 between processor C and B should fail, path map 520 would not be affected. However, interconnect matrix 500 would need to be updated to remove failed connection 518.

Figures 6, 8:
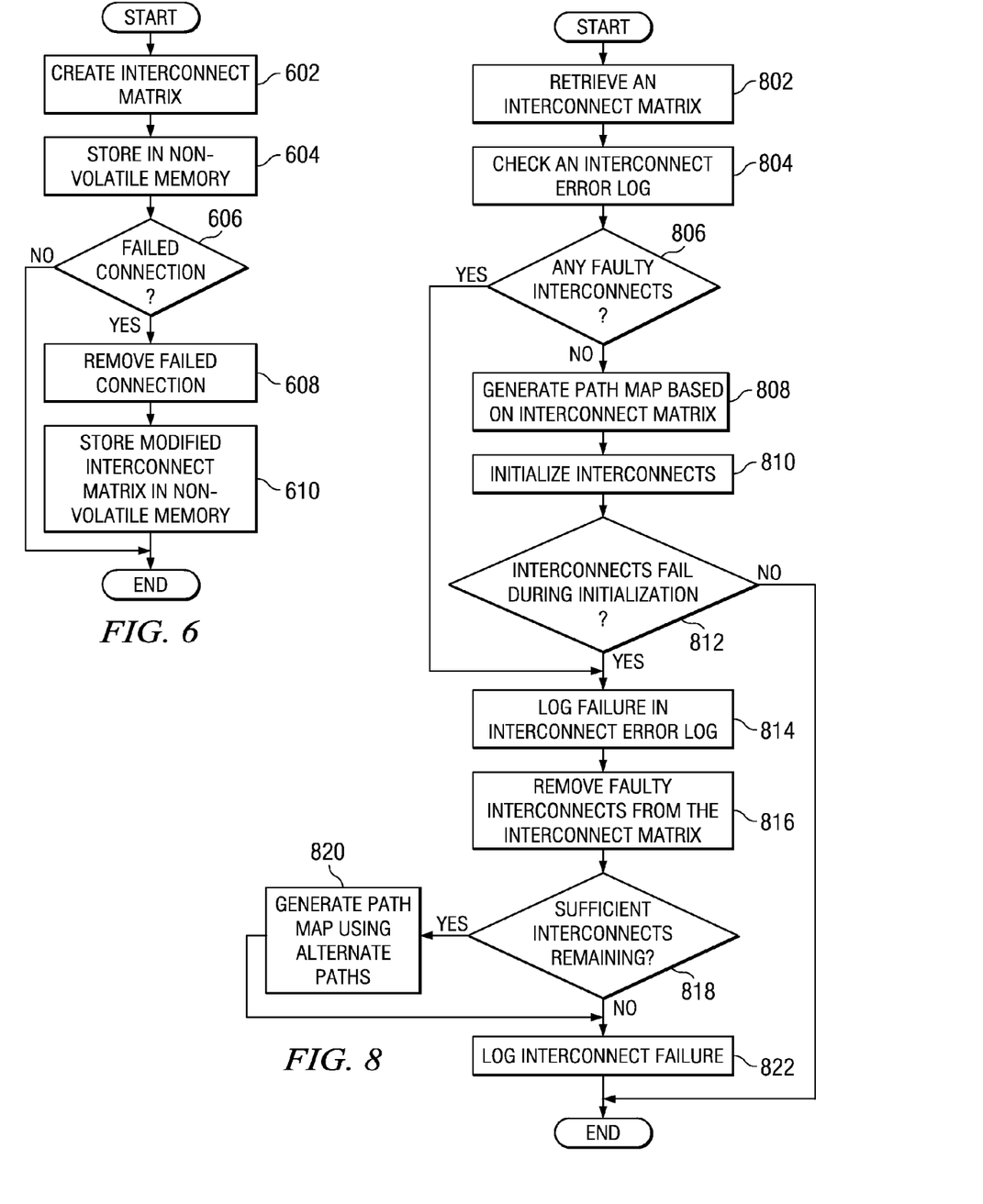
FIG. 6 is a flowchart illustrating a process for creating and updating an interconnect matrix in accordance with an illustrative embodiment.
FIG. 8 is a flowchart illustrating a process for generating a path map and an alternative path map in accordance with an illustrative embodiment.

Referring now to FIG. 6, a flowchart illustrating a process for creating and updating an interconnect matrix is shown in accordance with an illustrative embodiment. In this illustrative example shown in FIG. 6, the process is performed by a software component for managing interconnects, such as controller 401 in FIG. 4.

The process begins by creating an interconnect matrix during a system initialization (step 602). The process stores the interconnect matrix in non-volatile memory, such as NVRAM (step 604). The process makes a determination as to whether a connection has failed (step 606). If a connection has not failed, the process terminates thereafter. In other words, once the interconnect matrix is generated, the interconnect matrix is not re-generated, altered, modified, or updated unless a connection fails after generation of the interconnect matrix.

Returning to step 606, if a connection does fail, the process removes the failed connection from the interconnect matrix (step 608). The modified interconnect matrix is stored in non-volatile memory (step 610) with the process terminating thereafter.

Figure 7:
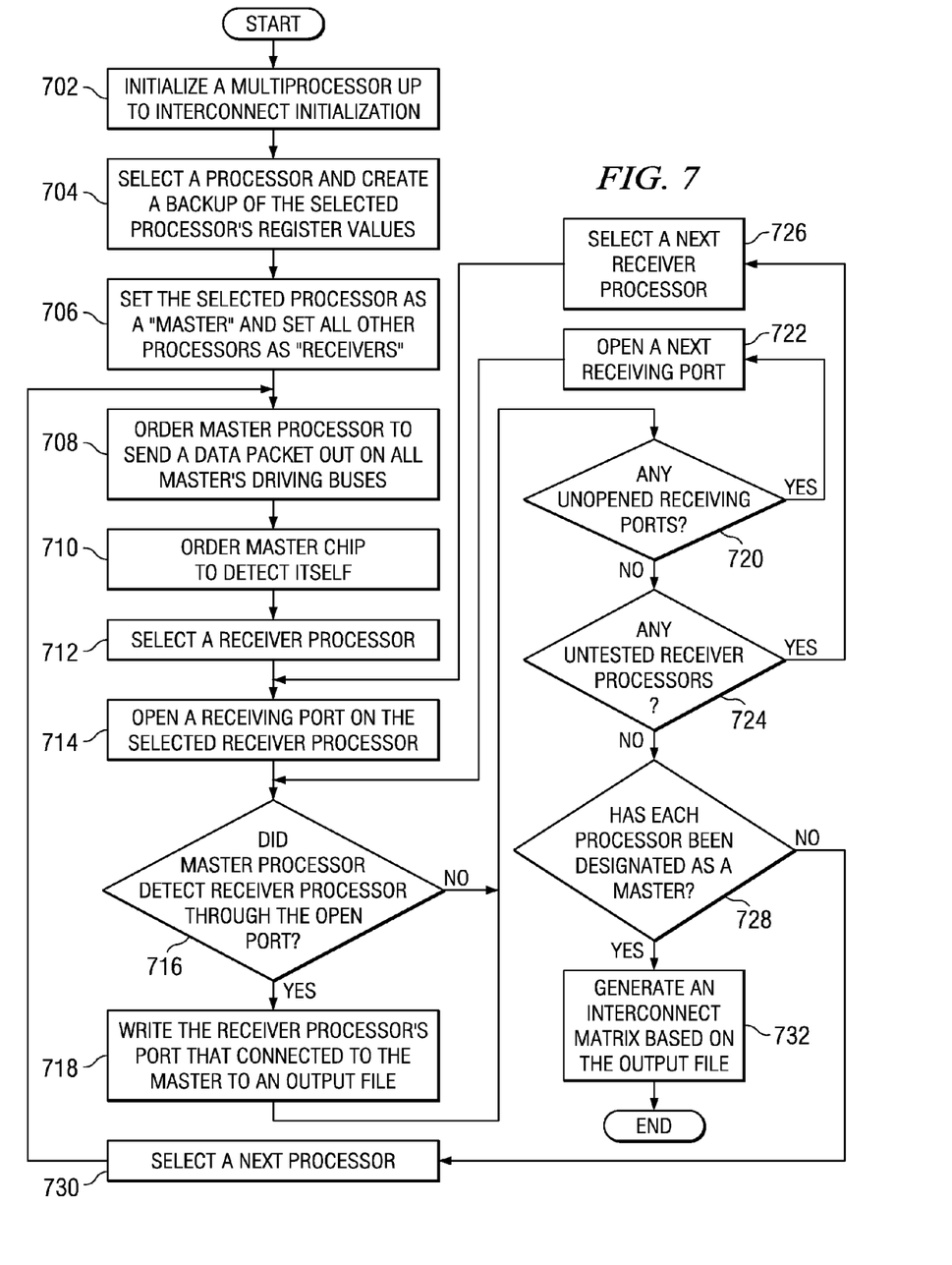
FIG. 7 is a flowchart illustrating a process for testing connections between processors in accordance with an illustrative embodiment.

FIG. 7 is a flowchart illustrating a process for testing connections between processors in accordance with an illustrative embodiment. In this illustrative example shown in FIG. 7, the process is performed by a software component for managing interconnects, such as controller 401 in FIG. 4.

The process begins by initializing a multiprocessor up to interconnect initialization (step 702). This step takes place during a system boot process. The process selects a processor and creates a backup of the selected processor's register values (step 704). The process sets the selected processor as a master processor and sets all other processors as receiver processors (step 706). The process orders the master to send a data packet out on all the master's driving buses or sending ports (step 708).

The process orders the master to detect itself (step 710). When a processor is designated as a master, the master processor confirms by showing that the master processor detected itself. Once the master processor detected itself, the master processor can send data packets out to all the other processors in the multiprocessor.

The process selects a receiver processor (step 712). The process opens a receiving port on the selected receiver processor (step 714). The process makes a determination as to whether the master processor detected the receiver processor through the open port (step 716). The process writes the receiver processor's port that connected to the master to an output file as a functional connection if the process did detect the open port (step 718).

If the process did not detect the open port at step 716 or after the process writes the functional connection to an output file at step 718, the process makes a determination as to whether any unopened receiving ports remain (step 720). If any unopened receiving ports remain, the process opens a next receiving port (step 722) and iteratively continues to execute steps 716-722 until all receiving ports on a given receiver processor have been opened and tested.

Once all receiving ports have been opened and tested at step 720, the process makes a determination as to whether any untested receiver processors remain (step 724). In other words, the process determines if each receiver processor on the multiprocessor has opened each of the receivers receiving ports. If "no", an untested receiver processor remains and the process selects a next receiver processor (step 726) and iteratively executes steps 714-724 until every receiving port on every receiver processor has been opened and tested.

Returning to step 724, if all receiver processors have been tested, the process makes a determination as to whether each process has been designated a master processor (step 728). If each processor has not been designated a master processor, the process selects a next processor (step 730) and iteratively continues to execute steps 708-728 until every processor has taken a turn as a master processor for the purpose of testing connections between the processor and the other receiver processors on the multiprocessor.

When all processors have been designated as a master processor at step 728, the process generates an interconnect matrix based on the output file (step 732) with the process terminating thereafter. The interconnect matrix includes all functional connections between every processor on the multiprocessor.

Turning now to FIG. 8, a flowchart illustrating a process for generating a path map and an alternative path map is shown in accordance with an illustrative embodiment. In this illustrative example shown in FIG. 8, the process is performed by a software component for managing interconnects, such as controller 401 in FIG. 4.

The process begins by retrieving an interconnect matrix for a multiprocessor (step 802). The process checks an interconnect error log (step 804). The error log indicates if any connections have failed.

The process makes a determination as to whether any faulty interconnects are present in the error log (step 806). If no faulty interconnects are present, the process generates a path map based on the interconnect matrix (step 808). The process initializes interconnects based on the path map (step 810). The process then makes a determination as to whether any interconnects fail during initialization (step 812).

If an interconnect fails during initialization at step 812 or if a faulty interconnect is detected at step 806, the process logs the failed connection in the interconnect error log (step 814) and removes the faulty interconnect from the interconnect matrix (step 816).

If the failed connection is not a connection in the interconnect path, the original path map can still be used to complete initialization of the processors. However, if the failed connection is a connection in the interconnect path, the process makes a determination as to whether sufficient interconnects remain to generate an alternative path map (step 818).

If sufficient interconnects do remain, the process generates a path map using an alternate path (step 820). The process logs the interconnect failure (step 822) and uses the alternate path map to initialize the multiprocessor with the processor terminating thereafter. The process identifies functional communication connections between each processor on a multiprocessor in an output file. The process generates an interconnect matrix based on the output file.

Returning now to step 818, if sufficient interconnects to generate an alternative path map are not available, the process logs the interconnect failure (step 822) and the process terminates thereafter.

An interconnect matrix is a map of every functional connection between any two processors in a plurality of processors. The process creates a path map based on the interconnect matrix. A path map is a sequence of communication connections between processors. The process initializes the processors in accordance with the path map. The process removes the failed connection from the interconnect matrix in response to a determination that a connection between two processors has failed to form a failed connection.

The illustrative embodiments traverse all the processors in a system. The process sets each processor to be a connecting master in turn. Each processor in the system opens its ports one at a time to determine if there is a direct connection between the processor and the master. Thus, all usable connections between processors are explored and written to an output file for use in generating an interconnect matrix and path map. In addition, an alternative path map can be generated if a connection fails. The system has more than one option of getting addresses, data, and sync packets between chips.

The illustrative embodiments replace the need for static processor bus maps by providing an algorithm to build an interconnect matrix and path maps at initialization of the system. This solution has the potential of producing smaller software builds rather than having a map for each system platform in firmware. Small software build may aid in faster load and initialization of the system. In addition, workbooks or schematics are not required to decipher the path map and interconnect matrix.

By using the interconnect map that was created during the initialization phase of the system, the system will utilize one of the alternative paths to finish initialization of the system. The system can continue the initialization process with minor or no interruptions until the system is fully initialized and continue to runtime. This is an advantage over current systems that will fail to initialize if a connection fails.

The flowchart and block diagrams in the figures illustrate the architecture, functionality, and operation of some possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the illustrative embodiment has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing symmetric multiprocessor interconnects, the computer implemented method comprising:
   identifying functional communication connections between each processor in a plurality of processors on a multiprocessor to form identified functional communication connections;
   mapping every functional communication connection between any two processors in the plurality of processors, based on the identified functional communication connections to form an interconnect matrix;
   creating a path map using the interconnect matrix, wherein the path map comprises a sequence of communication connections between the plurality of processors; and
   initializing the plurality of processors using the path map.

2. The computer implemented method of claim 1 further comprising:
   responsive to identifying a failed connection, removing the failed connection from the interconnect matrix, wherein a failed connection is a connection between two processors in the plurality of processors that has failed.

3. The computer implemented method of claim 2 wherein removing the failed connection from the interconnect matrix forms an updated interconnect matrix, and further comprising:
   responsive to a determination that the failed connection is a connection in the path map, generating an alternative path map based on the updated interconnect matrix, wherein the alternative path map bypasses the failed connection.

4. The computer implemented method of claim 3 wherein the failed connection is a connection that failed during run time, and further comprising:
   rebooting the system; and
   initializing the plurality of processors in accordance with the alternative path map.

5. The computer implemented method of claim 3 wherein the failed connection is a connection that failed during initialization, and further comprising:
   continuing initialization of the plurality of processors in accordance with the alternative path map.

6. The computer implemented method of claim 3 further comprising:
designating a system as unable to initialize only if an alternative path map cannot be generated due to insufficient functional interconnects remaining.

7. The computer implemented method of claim 1 further comprising:
storing the identified functional communication connections in an output file.

8. The computer implemented method of claim 1 wherein the step of identifying functional communication connections between each processor further comprises:
designating a processor in the plurality of processors as a master and designating all other processors in the plurality of processors as receiver processors;
initiating transmission of a data packet from a set of sending ports on the master to all receiver processors; and
opening a set of receiving ports on each receiver processor to determine whether each connection between the master and the receiver is a functional connection; and
identifying all functional connections in an output file.

9. The computer implemented method of claim 8 further comprising:
responsive to a determination that each processor in the plurality of processors has not been designated a master, iteratively designating a next processor as the master and designating all other processors as receiver processors; and
identifying all functional connections between the master and the receiver processors until each processor in the plurality of processors has been designated as the master.

10. The computer implemented method of claim 8 wherein the step of opening a set of receiver ports on each receiver processor further comprises:
opening a given receiver port in a set of receiver ports on the receiver processor;
determining whether the given receiver port receives the data packet sent by the master; and
responsive to determining that the given receiver port received the data packet, identifying a connection between the master and the given receiver port as a functional connection in the output file.

11. The computer implemented method of claim 10 further comprising:
responsive to a determination that each receiver port in the set of receiver ports has not been opened, iteratively opening each receiver port and determining if the opened receiver port received the data packet, wherein a connection between the master and the opened receiver port is identified as a functional connection in the output file if the opened receiver port received the data packet.

12. The computer implemented method of claim 1 wherein the interconnect matrix and path map are saved in non-volatile memory.

13. A computer program product comprising:
a computer recordable storage medium having computer usable program code for symmetric multiprocessor interconnects, the computer program product comprising:
computer usable program code for identifying functional communication connections between each processor in a plurality of processors on a multiprocessor to form identified functional communication connections;
computer usable program code for mapping every functional communication connection between any two processors in the plurality of processors, based on the identified functional communication connections to form an interconnect matrix;
computer usable program code for creating a path map using the interconnect matrix, wherein the path map comprises a sequence of communication connections between the plurality of processors; and
computer usable program code for initializing the plurality of processors using the path map.

14. The computer program product of claim 13 further comprising:
computer usable program code for removing the failed connection from the interconnect matrix to form an updated interconnect matrix in response to a determination that a connection between two processors in the plurality of processors has failed.

15. The computer program product of claim 14 further comprising:
computer usable program code for generating an alternative path map based on the updated interconnect matrix in response to a determination that the failed connection is a connection in the path map, wherein the alternative path map bypasses the failed connection.

16. The computer program product of claim 13 wherein the failed connection is a connection that failed during initialization, and further comprising:
computer usable program code for continuing initialization of the plurality of processors in accordance with the alternative path map.

17. An apparatus for managing symmetric multiprocessor interconnects, the apparatus comprising:
a computing device, the computing device comprising:
a bus;
a storage device connected to the bus, wherein the storage device contains a computer usable program product; and
a plurality of processors, wherein at least one processor in the plurality of processors executes the computer usable program code to identify functional communication connections between each processor in a plurality of processors on a multiprocessor in an output file; generate an interconnect matrix based on the output file, wherein an interconnect matrix is a map of every functional communication connection between any two processors in a plurality of processors; create a path map based on the interconnect matrix, wherein a path map is a sequence of communication connections between a plurality of processors; and initialize the plurality of processors in accordance with the path map.

18. The apparatus of claim 17 wherein the processor further executes the computer usable program code to remove the failed connection from the interconnect matrix in response to a determination that a connection between two processors in the plurality of processors has failed.

19. A multiprocessor, the multiprocessor comprising:
an interconnect bus;
a plurality of processors;
a memory; and
a controller, wherein the controller identifies functional communication connections between each processor in the plurality of processors in an output file in the memory; generates an interconnect matrix based on the output file, wherein an interconnect matrix is a map of every functional communication connection between any two processors in a plurality of processors; creates a path map based on the interconnect matrix, wherein a path map is a sequence of communication connections between a plurality of processors; and initializes the plurality of processors in accordance with the path map.

20. The multiprocessor of claim 19 wherein the controller removes a failed connection from the interconnect matrix to form an updated interconnect matrix in response to a determination that a connection between two processors has failed, and wherein the controller generates an alternative path map based on the updated interconnect matrix in response to a determination that the failed connection is a connection in the path map, wherein the alternative path map bypasses the failed connection.

* * * * *